US006871288B2

(12) United States Patent
Russikoff

(10) Patent No.: US 6,871,288 B2
(45) Date of Patent: Mar. 22, 2005

(54) COMPUTERIZED PASSWORD VERIFICATION SYSTEM AND METHOD FOR ATM TRANSACTIONS

(76) Inventor: Ronald K. Russikoff, 1376 Abbey Way, Bensalem, PA (US) 19020

(*) Notice: Subject to any disclaimer, the term of this patent is extended or adjusted under 35 U.S.C. 154(b) by 159 days.

(21) Appl. No.: 10/371,081

(22) Filed: Feb. 21, 2003

(65) Prior Publication Data

US 2004/0168067 A1 Aug. 26, 2004

(51) Int. Cl.[7] ............................ H04L 9/32; G06E 17/60

(52) U.S. Cl. ...................... 713/202; 715/202; 340/5.41; 340/5.85; 340/7.5

(58) Field of Search ......................... 713/202; 340/5.41, 340/5.85, 7.5; 235/379

(56) References Cited

U.S. PATENT DOCUMENTS 3,778,595 A * 12/1973 Hatanaka et al. ........... 235/379
4,812,841 A * 3/1989 Chen ......................... 340/5.27
5,354,974 A * 10/1994 Eisenberg ................... 235/379
5,731,575 A * 3/1998 Zingher et al. ............. 235/379
5,821,933 A * 10/1998 Keller et al. ................ 345/741
6,154,879 A * 11/2000 Pare et al. .................... 705/35
6,351,634 B1 * 2/2002 Shin ........................... 455/410
6,679,422 B2 * 1/2004 Brown et al. ............... 235/379

* cited by examiner

*Primary Examiner*—Gregory Morse
*Assistant Examiner*—Jacob Lipman
(74) *Attorney, Agent, or Firm*—Armand M. Vozzo, Jr.

(57) ABSTRACT

A computerized password verification system and associated method is disclosed for discreet recognition and reporting of a duress transaction being imposed upon a user at an ATM or other remote cash-dispensing terminal. The inventive system utilizes conventional ATM hardware including a card reader, keypad and display together with its associated operating and communications software required for transaction processing, and further comprises the programmed generation and display screen of a list of transaction acceptance passwords (TAPs) with a prompt to the user for a TAP selection to confirm the validity of the immediate transaction. The prompted display of the TAP list appears following the initial acceptance of the user's personal identification number (PIN) and requires the ATM user to select the TAP from the list that is currently registered to the user. While selection of the user's current TAP from the prompted list verifies the immediate transaction, the selection of any other TAP from the displayed list would constitute a "panic" TAP that triggers the generation of a silent alert signal to the authorities.

15 Claims, 4 Drawing Sheets

COMPUTERIZED PASSWORD VERIFICATION SYSTEM AND METHOD FOR ATM TRANSACTIONS

BACKGROUND OF THE INVENTION

The present invention relates to computerized financial transactions of the type conducted at remote terminals, such as automatic teller machines (ATMs), and more particularly to a computerized system and associated method for password verification in the processing of a remote terminal transaction that improves the discreet recognition and reporting of a transaction imposed upon a user under duress.

The recent proliferation of ATM installations throughout the United States has resulted in billions of ATM transactions being conducted annually. To protect ATMs against fraud and generally prevent unauthorized access to customer accounts by third parties using stolen or detected customer identification information, security systems have been devised for ATM use and incorporated within the associated electronic communications networks that encrypt and decrypt customer account information in transmissions between the ATM terminal and central computer in order to make deciphering difficult and any intercepted information unusable. These prior art security measures, generally complex and sophisticated in their designs, have been generally effective in disrupting and preventing electronic fraud in the normal transaction processing of ATMs. They have not, however, effectively dealt with the common and ongoing problem of a duress transaction that is imposed upon an ATM user under threat of physical harm by a thief at a remote terminal location.

Typically in these duress transactions, the victimized ATM user is accosted by the thief and forced to make a cash withdrawal from the user's account. To avoid immediate harm, the innocent ATM user must choose to comply with the demands of the thief and proceed as normally as possible with the standard protocol for cash withdrawals. Failure by the ATM user to follow a course other than the standard protocol, whether caused by panic confusion or done deliberately to reject the transaction and deny the withdrawal, will likely place the ATM user in immediate danger of retaliation. For these duress cases, it is desirable that the ATM feature a security system designed to recognize the forced nature of the transaction and further trigger a distress signal to police or other monitoring authorities. This distress signal to the authorities can provide a prompt response to the ongoing criminal activity; however, the signal must be made discreetly and in as normal a protocol as possible in order to avoid recognition by the thief and retaliation against the ATM user.

Prior art systems have been devised and developed for the discreet identification of a duress transaction and consequent registration of a silent alarm signal with the authorities. While these prior art systems, most notably those described in U.S. Pat. Nos. 5,354,974 and 5,731,575, are found to present satisfactory methodologies for recognizing and signaling the occurrence of a duress transaction, there is reliance upon the victimized ATM user to key in an assigned personal distress number or a valuation of his personal identification number in order to trigger system operation. Under the dramatic stress of the situation, it is quite likely that the panicked ATM user could go blank and not remember any part or variation of the assigned number and the resultant rejection of the transaction would place the innocent ATM user at a high risk of harm. Accordingly, there is a need for an improved ATM security system that simplifies the process for the victimized ATM user to initiate the silent alarm of an ongoing duress transaction.

SUMMARY OF THE INVENTION

Accordingly, it is a general purpose and object of the present invention to provide an improved system and associated method for guarding innocent customers against the dangers of duress transactions that may be imposed upon them at ATMs and other remote financial terminals.

A more particular object of the present invention is to provide a system and associated methodology for ATM transactions that permits discreet identification of the ongoing occurrence of a duress transaction and the silent alarm signaling to authorities of the event in a manner more routine and simple to execute by the ATM user under duress.

Another object of the present invention is to provide a system and associated method for securing the validity of a normal ATM transaction and for recognizing the occurrence of a duress transaction with an immediate report thereof, Still another object of the present invention is to provide a computerized process for the recognition and reporting of the occurrence of a duress transaction at an ATM that is integrated into the regular course of transaction processing conducted at the ATM.

A still further object of the present invention is to provide a safe and reliable computerized system for effectively responding to the occurrence of a duress transaction at an ATM without risk of harm to the victimized ATM user.

Briefly these and other objects of the present invention are accomplished by a computerized password verification system and associated method for discreet recognition and reporting of a duress transaction being imposed upon a user at an ATM or other remote cash-dispensing terminal. The inventive system utilizes conventional ATM hardware including a card reader, keypad and display screen together with its associated operating and communications software required for transaction processing, and further comprises the programmed generation and display of a list of transaction acceptance passwords (TAPs) with a prompt to the user for a TAP selection to confirm the validity of the immediate transaction. The prompted display of the TAP list appears following the initial acceptance of the user's personal identification number (PIN) and requires the ATM user to select the TAP from the list that is currently registered to the user. While selection of the user's current TAP from the prompted list verifies the immediate transaction, the selection of any other TAP from the displayed list would constitute a "panic" TAP that triggers the generation of a silent alert signal to the authorities. The generation and prompted display of the group list of TAPs from which the user can select one, without necessity of recalling a precise distress code, significantly increases the likelihood of the successful and discreet trigger of the alert signal by the ATM user under stress.

For a better understanding of these and other aspects of the present invention, reference should be made to the following detailed description taken in conjunction with the accompanying drawings in which like reference numerals and characters designate like parts throughout the figures thereof.

BRIEF DESCRIPTION OF THE DRAWINGS

For a full understanding of the nature and object of the present invention, references in the detailed description of the preferred embodiment set forth below shall be made to the accompanying drawings in which.

DETAILED DESCRIPTION OF THE INVENTION

The following is a detailed description of the preferred embodiment of the present invention and the best presently contemplated mode of its production and practice. This description is further made for the purpose of illustrating the general principles of the invention but should not be taken in a limiting sense, the scope of the invention being best determined by reference to the appended claims.

Figure 1:
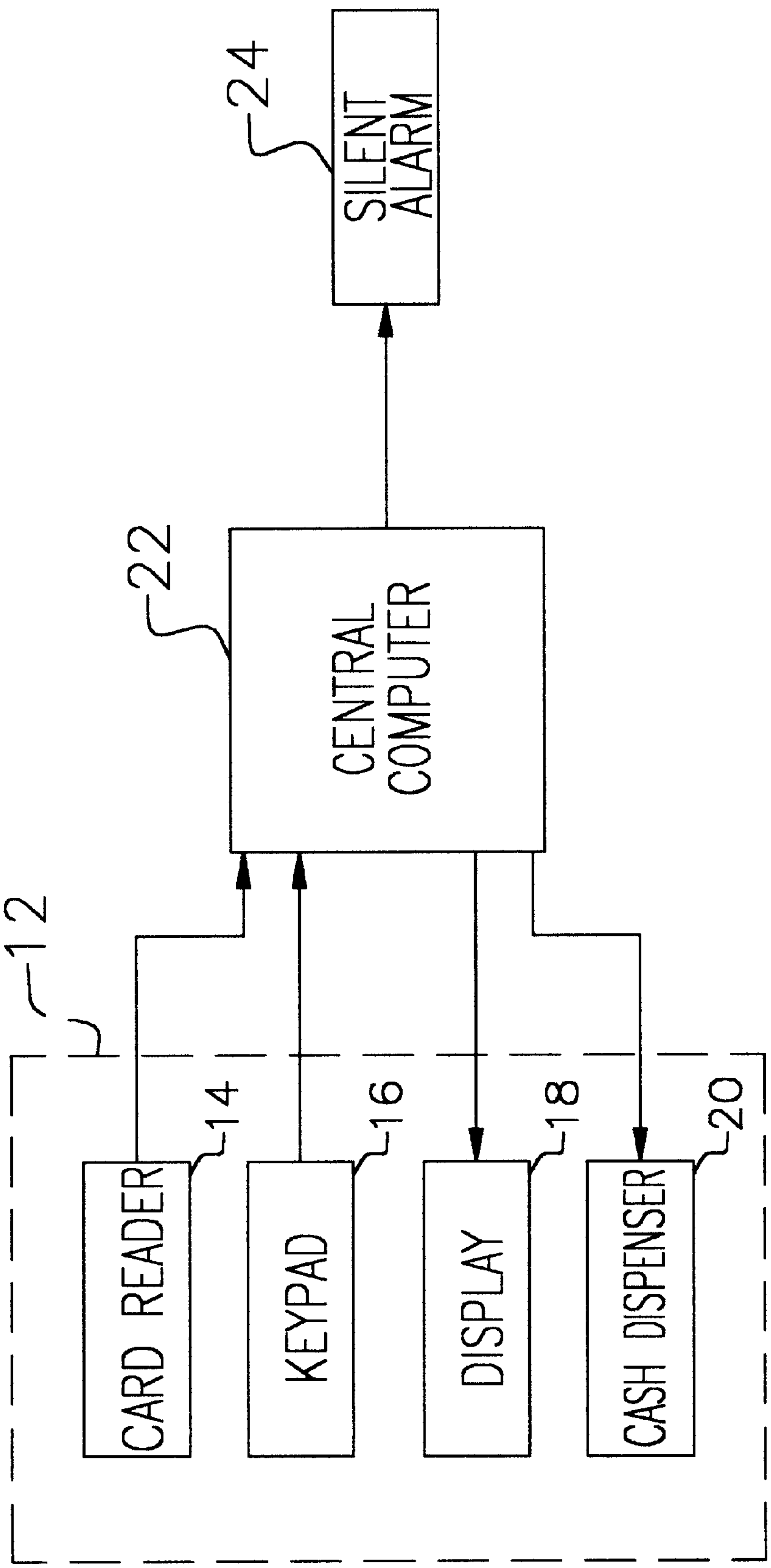
FIG. 1 is a block diagram of the computerized system in accordance with the present invention.
Figure 2:
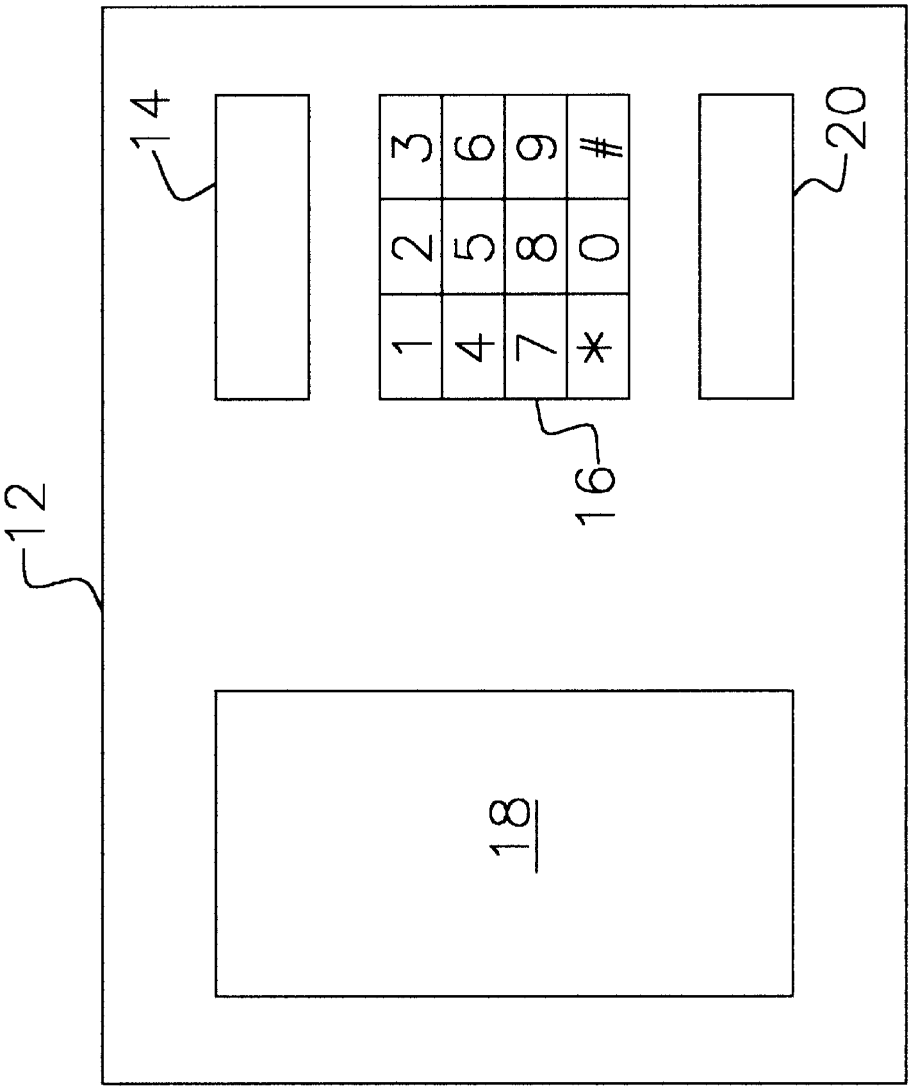
FIG. 2 is a front view in simplified form of an automated teller machine and its standard features used in accordance with the present invention.

Referring now to FIGS. 1 and 2, the present password verification system incorporates and includes a standard automatic teller machine (ATM) 12 having a conventional magnetic card reader 14, a user keypad 16, a display screen 18 and a cash dispenser 20. A typical physical layout of these hardware features of the ATM 12 is shown for example in FIG. 2 but may be varied without affecting the system operation. The system also includes a central computer 22 that processes data obtained from the card reader 14 and that information entered by the user on keypad 16, and prompts the user via the display screen 18 in order to actuate cash dispenser 20 and complete a cash withdrawal by the user.

To initiate a normal transaction at ATM 12, the user first inserts into the card reader 14 a personal access card (not shown) that is issued to the user having identification information, particularly a personal identification number (PIN), stored thereon, typically by means of a magnetic strip or bar code impressed upon the card. After the card is read and the PIN forwarded to the central computer 22 for processing, a prompt for PIN verification is requested of the user on the display screen 18. These normal steps of card reading and prompting for PIN, shown in FIG. 3 as 30 and 32, respectively, are immediately followed by the user entry of the PIN via the keypad 16 in step 34. If the entered PIN is correct, as determined via the central computer 22 in step 36, normal transaction processing continues. If the entered PIN is incorrect, the transaction is rejected in step 38 and further processing discontinued until the correct PIN is entered, typically upon a repeat prompt to the user for reentry.

Figure 3:
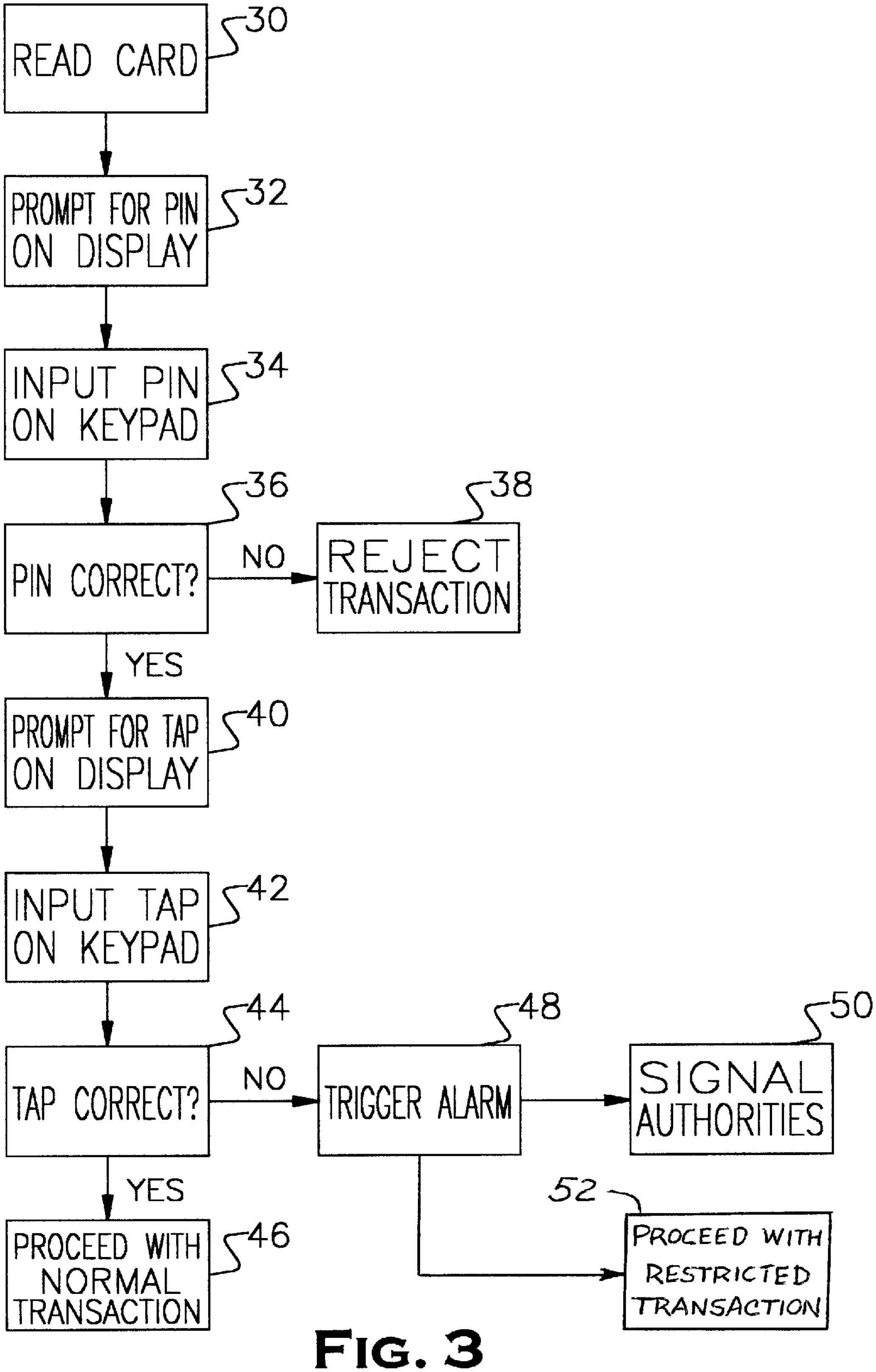
FIG. 3 is a flow chart of the methodology associated with the present invention.
Figure 4:
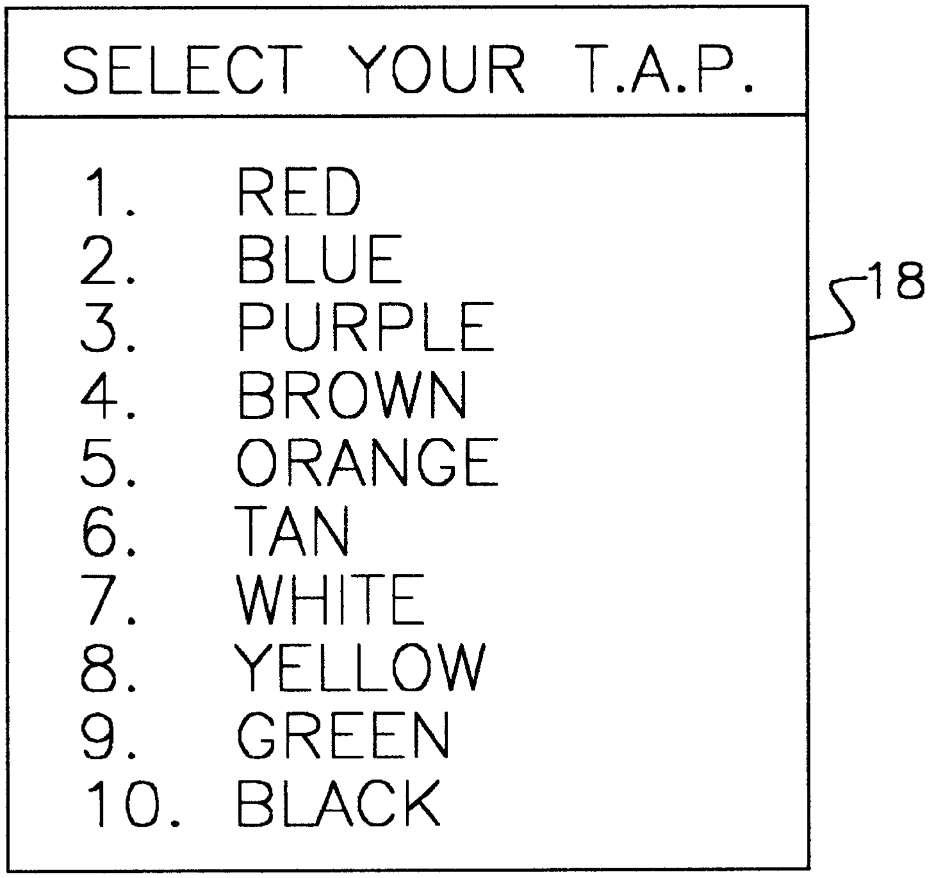
FIG. 4 is an illustration of the prompted display generated in accordance with the present invention and pursuant to the methodology shown in FIG. 3.

Referring now more particularly to FIGS. 3 and 4 in conjunction with FIG. 1, the system and associated method of the present invention supplements the aforedescribed normal transaction processing as follows. Upon the correct keypad entry of the PIN by the user, the central computer 22 is signaled and programmed to prompt the user via the display screen 18 in step 40 for confirmation of a transaction acceptance password (TAP) pre-assigned and registered to the user. The TAP, which may be in the category of a color or other generic group, is intended to serve as additional verification of the user's identity and provide further validation of the intended transaction. The prompt for the TAP of the user in step 40 is generated on the display screen 18 with a list of TAPs, as shown in FIG. 4, one of which is the pre-assigned TAP registered to the user. Presented with the list of TAPs for selection, the user, under normal circumstances, would enter the currently registered TAP, in this case for example, "white", by entering "7" on the keypad 16, and on verification by the central computer 22 of the TAP entered in step 44, the desired transaction of the user would proceed in step 46 and normal transaction processing would continue.

In the case of the ATM user being victimized in an ongoing duress transaction, the same prompt for selection of a TAP in step 40 would present itself on display screen 18 with a list of possible TAPs to choose from. In this distress case, however, the ATM user may choose any one or a preselected group of the listed passwords other than the correct TAP of the user and in so doing, trigger a silent alarm signal via the central computer 22 in step 48. The alarm signal indicative of an ongoing duress transaction at the ATM 12 is forwarded to local police authorities in step 50 for immediate dispatch of personnel to the ATM location. The alarm signal to police may be combined with or contain information regarding the ATM location, the user/customer identity as well as other data associated with the user/customer. The alarm signal may also activate a hidden on-site camera (not shown) at the ATM location that may be used by the police or a private monitoring firm to verify occurrence of the duress transaction and to gather evidence thereof.

At the same time that the alarm signal is triggered and transmitted to the authorities, the central computer 22 is programmed to proceed with a restricted form of a transaction in step 52. This restricted transaction processing, initiated and conducted concurrently with the silent alarm signal, is intended to limit the amount of funds that may be available for withdrawal, such as by establishing a reduced cash advance limit, and further to delay the completion of the transaction, presumably a cash withdrawal, so that the authorities would have greater opportunity to respond to the ATM location while the criminal activity was still in process.

It should be recognized that the programmed routine for a supplemental password verification system in ATM transactions, as set forth above, with its steps of generating a group list of TAP choices via the central computer 22 after initial confirmation of the user's PIN, and the subsequent displaying of that list on display screen 18 with a prompt for selection of the user's currently registered TAP, thus serves normal transaction processing at the ATM with additional security. Of further note and equally as important, the method of providing the supplemental password verification by way of the prompted display of a list of password choices for user selection provides an effective technique for the victimized ATM user under stress to make proper entry of a "panic" password in order to signal the ongoing occurrence of a duress transaction. The generation and prompted display of the list of TAPs from which the user can choose, rather than recall a precise distress code number, significantly increases the likelihood of the successful and discreet trigger of the alert signal by the ATM user under the stress and anxiety of the duress transaction.

The number of the TAPs that are generated and displayed for selection may be varied, with at least two being needed to provide an option to the ATM user for normal and duress transaction cases. A greater number of the listed TAPs, such as the ten as shown in FIG. 4, is recommended to reduce the risk that an unauthorized user having a lost or stolen personal access card and knowledge of the associated PIN will correctly select pre-assigned TAP from among those listed. The generic grouping of the listed TAPs may too be varied in its category and may, in accordance with the present inventive system, be displayed as visual images of articles rather than as "words" for selection by the ATM user.

After the silent alarm is triggered by the central computer 22 and forwarded to the authorities in step 50, a number of additional measures can be taken in response to the alert given of the ongoing duress transaction. For instance, a simultaneous message signal may be generated and sent to a private monitoring station operated by the bank or other financial institution in connection with the instant ATM to further alert and secure other nearby ATM sites and warn their users of the proximate threat. In addition, the cash currency that may be ultimately dispensed to the ATM user in connection with the processing of a restricted transaction in step 52 can be marked or scanned by conventional means at the ATM site prior to its dispensing for subsequent identification and evidentiary purposes.

Therefore, it is apparent that the described invention provides an improved system and associated method for protecting innocent customers against the dangers of duress transactions that may be forced upon them at an ATM or other cash-dispensing terminal. The present invention more particularly provides a computerized ATM system and associated methodology that discreetly identifies and signals the ongoing occurrence of a duress transaction in a more routine and simple to execute format to the threatened ATM user under stress. In addition, the present invention provides additional confirmation of the validity of a normal ATM transaction while identifying the occurrence of one under duress with an immediate alert and report thereof. The present invention further provides a programmed process for the recognition and reporting of a duress transaction that is integrated into the regular sequence of transaction processing conventionally conducted at ATMs. Furthermore, the present computerized system provides a safe and reliable means and method for responding to the occurrence of a duress transaction at an ATM without furthering the risk of harm to the victimized ATM user.

Obviously, other embodiments and modifications of the present invention will readily come to those of ordinary skill in the art having the benefit of the teachings presented in the foregoing description and drawings. Alternate conventional means as well as substitute systems that may be developed at a future time to perform the same function as the present described embodiment are therefore considered to be part of the present invention. For example, the keypad entry of the TAP selection by the ATM user for respective normal and duress transactions may be made by an alternative input device, such as a voice or word recognition system, installed at the terminal site. As a further example, the display screen 18 may be one that incorporates pressure sensitive technology so that input selections by the user may be made by touch of the screen and without need for keypad 16. Accordingly, it is understood that this invention is not limited to the particular embodiment described, but rather is intended to cover modifications within the spirit and scope of the present invention as expressed in the appended claims.

What is claimed is:

1. In a method for operating an automatic teller machine system of the type used to dispense cash to a customer from an associated account and having a card reader for reading a personal access card of the customer with a personal identification number stored thereon, means for inputting a customer selection, a display screen and a central computer for processing a customer request for a cash withdrawal, the improvement comprising the steps of:

after reading the personal access card and verifying the personal identification number of the customer;

generating a plurality of transaction acceptance passwords in the central computer, one of the plurality of passwords being pre-assigned to the customer and stored in the central computer;

displaying the plurality of passwords on the display screen in a grouped format together with a prompt to the customer for selection of the pre-assigned password;

dispensing the cash requested for withdrawal upon the inputted selection of the pre-assigned password of the customer; and signaling authorities upon the inputted selection of one of the plurality of passwords other than the pre-assigned password as indication that the customer request for cash withdrawal is being made under duress.

2. The improved method according to claim 1, further comprising:

concurrent with the step of signaling authorities, dispensing a limited amount of cash to the customer less than requested.

3. The improved method according to claim 2, further comprising:

before the step of dispensing a limited amount of cash to the customer, marking the cash for subsequent identification.

4. The improved method according to claim 1, further comprising:

concurrent with the step of signaling authorities, visually recording the customer at the location of the automatic teller machine system to verify that the request for cash withdrawal is being made under duress.

5. The improved method according to claim 1, wherein the grouped format of the plurality of passwords displayed is a list for selection by the customer.

6. The improved method according to claim 5, wherein the passwords in the list are displayed as respective visual images of articles.

7. A method for the discreet recognition and reporting of a duress transaction being imposed upon a customer at a remote cash-dispensing terminal having a display screen, means for inputting of a customer selection, means for reading a transaction card having a personal identification number of the customer stored therein, and computer means for processing a customer request for cash, said method comprising the steps of:

after the transaction card is read into the computer means and the personal identification number of the customer is verified;

generating a plurality of transaction acceptance passwords in the computer means, one of the plurality of passwords being pre-assigned to the customer and stored in the computer means;

displaying the plurality of passwords on the display screen in a grouped format together with a prompt to the customer for selection of the pre-assigned passwords; and signaling authorities upon the inputted selection of one of the plurality of passwords other than the pre-assigned password of the customer.

8. The method according to claim 7, further comprising:

concurrent with the step of signaling authorities, dispensing cash in a limited amount less than requested by the customer.

9. The method according to claim 8, further comprising:

marking the cash prior to the step of dispensing a limited amount thereof.

10. The method according to claim 7, further comprising:

at the same time as signaling authorities, visually recording the customer at the terminal to verify the duress transaction.

11. The method according to claim 7, wherein the plurality of passwords are in the grouped format of a list.

12. The method according to claim 11, wherein the passwords in the list are displayed as respective visual images of articles.

13. In an automatic teller machine system of the type used to dispense cash to a customer and having a display screen, means for inputting customer selections, means for reading a transaction card with a personal identification number of the customer stored therein, and a central computer for processing a cash request from the customer, the improvement comprising:

first means for instructing the central computer to generate a plurality of transaction acceptance passwords after the personal identification number is read into the central computer and verified, one of the plurality of passwords being pre-assigned to the customer and stored in the central computer;

second means for instructing the central computer to display the plurality of passwords on the display screen grouped in a list and having a prompt to the customer for selection of the pre-assigned password;

third means for instructing the central computer to dispense the cash request upon the inputted selection of the pre-assigned password; and fourth means for instructing the central computer to signal authorities of a duress cash request upon the inputted selection of one of the plurality of passwords other than the pre-assigned password and further to dispense a limited amount of cash in response to the request.

14. The system according to claim 13, further comprising:

fifth means for visually recording the customer at the automatic teller machine terminal to verify the duress request.

15. The system according to claim 14, further comprising:

sixth means for marking the limited amount of cash dispensed for subsequent identification.

* * * * *